March 18, 1969 C. W. GILBERT ET AL 3,433,942
PILOT LINE SYNCHRONIZED PHASE SELECTIVE TRACK CIRCUIT
Filed Jan. 24, 1967
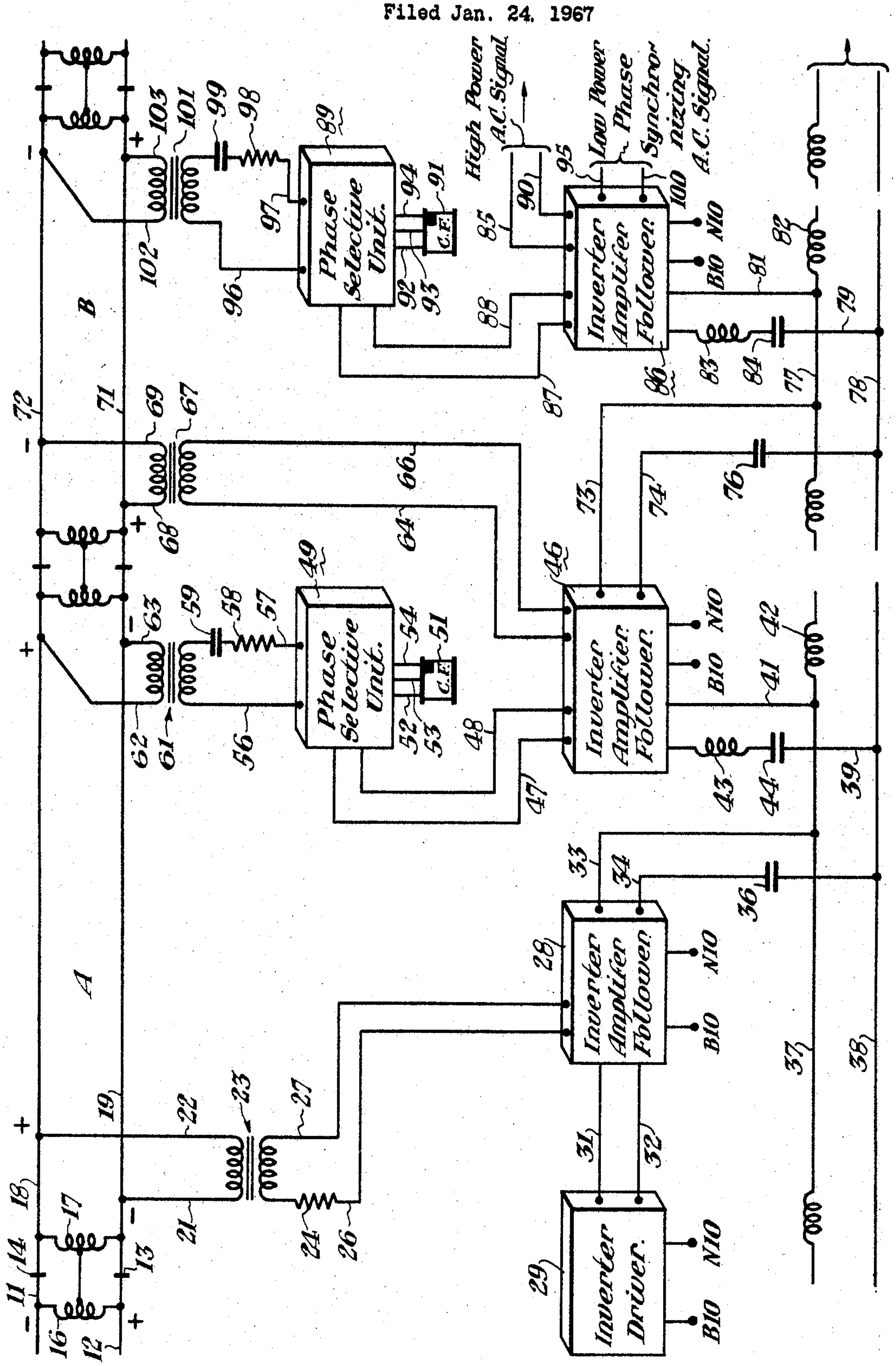

United States Patent Office 3,433,942
Patented Mar. 18, 1969

3,433,942
PILOT LINE SYNCHRONIZED PHASE SELECTIVE TRACK CIRCUIT

Chalmers W. Gilbert, Penn Hills Township, Allegheny County, and Ralph Popp, Pittsburgh, Pa., assignors to Westinghouse Air Brake Company, Swissvale, Pa., a corporation of Pennsylvania Filed Jan. 24, 1967, Ser. No. 611,429
U.S. Cl. 246—34 8 Claims
Int. Cl. B61l 25/00

ABSTRACT OF THE DISCLOSURE

A phase sensitive train detection system in which provision is made for insuring an operation of the phase sensitive track circuits during failure of the commercial power supplies. The train detection is obtained by means of phase selective units connected to track circuits requiring relatively high power produced by means of amplifier followers energized from a direct current source, which are normally kept charged by rectifiers connected to a commercial power source. Each inverter amplifier follower also produces a synchronizing signal which can be carried from one inverter amplifier follower to the next inverter amplifier follower over either spare signaling wires disposed along the wayside or over other available signaling circuits, thus eliminating the need for a separate high power transmission system in which the proper signaling frequency is adequately maintained.

This invention relates to an improvement for a phase sensitive train detection system in which continuous operation of the phase selective track circuits will be provided during power outage or interruption.

More specifically, this invention relates to the operation of phase selective track circuits from a standby source of direct current power so that standby operation will be provided during power outage. The phase synchronization required for this type of track circuit is provided by a low energy signal carried on spare signaling wires along the wayside or superimposed on other signaling circuits. The large quantities of track circuit energy required at each track circuit feed point are generated by means of amplifier followers energized by a direct current source such as storage batteries which are in turn charged from rectifiers connected either to commercial alternating current power or to the catenary of the propulsion system.

In the past, phase sensitive track circuits have been used in alternating current propulsion territory in order to prevent operation of a track relay falsely from energy fed, though a broken down insulated joint, or from an adjacent track circuit. Phase sensitive track circuits have proven themselves over the years as being less costly to operate from a maintenance standpoint than the centrifugal relay type of circuit previously used to provide this broken down insulated joint protection in alternating current propulsion territory.

The prior art phase selective track circuits have required that all phase selective track circuits must be fed either from the same power source or from sources of the same frequency which are synchronized so that the track circuit feed and the local energy to a phase selective unit of a particular circuit have a constant relationship and that the instantaneous polarities of adjacent circuits are arranged to be opposite. In the past this has been accomplished by utilizing the same power source by means of a transmission line along the wayside. In other environments the power may be derived from the catenary with step-down transformers at each location, and by means of frequency multiplying inverters to obtain the appropriate alternating current power of the appropriate phase relationship at each location for track circuit operation. These prior art schemes have been plagued by the problem of temporary power outage coupled with the fact that, while the territories utilizing the phase selective track circuits are alternating current propulsion in nature, there frequently arises the need to have trains pulled by Diesel powered locomotives, which may necessitate removal of catenary power for short periods of time. The invention to be described uniquely solves these just noted problems in a fashion heretofore unknown.

It is therefore an object of this invention to provide standby power for track circuit operation without the need for employing costly high energy transmission lines along the wayside to provide the required synchronous power to the phase selective track circuits.

Another object of this invention is to cope with the problem of power outage by the utilization of the generation of large quantities of alternating current power from battery storage sources at each track feed point with very low pilot line synchronizing energy.

Yet another object of this invention is to provide for precise synchronization of power delivered to the track sections of phase selective track circuits by the unique utilization of preexisting unused line wires along the wayside to carry low energy synchronizing power, or by the superimposing of the low energy synchronizing power on a signaling circuit such as a direct current line relay circuit, thereby obviating the expense of added line wires to accomplish this end.

In the attainment of the foregoing objects there is provided a phase sensitive train detection system which has a plurality of track sections insulated one from another. Each of the track sections has an alternating current energy signal of a relatively high power level fed to the rails of the track section at one end of the track section. The polarity of the alternating current energy signal of a relatively high power level fed any one of the track sections is of opposite polarity to the adjacent track sections and each of the track sections has electrically coupled at its other end a phase selective unit to compare the alternating current energy signal received from the rails through the electrical coupling with a matching polarity alternating current signal fed to the phase selective unit.

The improvement to this system lies in the provision of continuous operation of the phase selective track circuits from standby power such as battery power so that standby operation will be provided during removal of external power. The improvement to the system includes at least one converter unit to convert direct current energy to the relatively high power level alternating current energy signal aforementioned to provide the necessary high power level alternating current energy signal to the rails of at least one of the track sections at the one end of the track section as well as providing a relatively low power level alternating current energy phase synchronizing signal.

The converter includes an inverter unit supplied by standby direct current power, the inverter having an alternating current output delivered to an inverter follower amplifier, which follower amplifier provides at least two alternating current signals, one of which is a relatively high power level signal which is to be fed to the one end of the track section, and the other signal is the relatively low power level phase synchronizing signal referred to above.

A follower amplifier is responsive to the just noted low power level alternating current phase synchronizing signal to provide at least one alternating current signal to said phase selective unit for phase comparison, and a relatively high power level alternating current signal to the adjacent track section at its one end. The follower amplifier also produces at least a third alternating current signal of a relatively low power level for phase synchronization in adjacent track sections. The follower amplifier has its own source of standby direct current power.

Other objectives and advantages of the present system will become apparent from the ensuing description of illustrative embodiments thereof, in the course of which reference is had to the single embodiment illustrated in the accompanying drawing.

A description of the above embodiment will follow and then the novel features of the invention will be presented in the appended claims.

Reference is now made to the sole figure in this application. There is depicted at the top of the figure a plurality of track sections A and B with rails 11 and 12 interconnected by the one winding 16 of an impedance bond of well-known construction, and separated from the adjoining track section A by insulated joints 14 and 13. The winding 16 is connected to another winding 17 of the impedance bond, which latter winding, in turn, interconnects the rails 18 and 19, the impedance bonds here providing the conventional balancing function inherent in alternating current track circuits. The phase selective track circuits which are employed in this invention are set forth and explained in detail in Letters Patent of the United States No. 3,046,454, issued July 24, 1962, to Crawford E. Staples, for Code Detector Circuits. Reference is made to this patent for a complete description of the theoretical operation of phase selective track circuits. It need only be recognized for this application that the relative polarities in each of the adjoining track sections are opposite to the preceding track section or the following track section on either side of the track circuit being studied. Accordingly, there will be noticed depicted in each of the track sections both a positive and negative designation to indicate the relative nature of the phase relationship of the current appearing in the phase selective track circuit under study.

Therefore, track section A has, at its left-hand end above rail 18, a positive sign, while rail 19 at the left-hand end has a negative symbol. In a similar manner, at the right-hand end of track section A there is a positive symbol above rail 18, while beneath rail 19 at the right-hand end there is a negative symbol. In the adjoining track section B, it will be appreciated that the polarity of the track section B and the current of the rails 71 and 72 of that track section are exactly opposite to the polarity of the alternating current in track section A. While this application illustrates a pair of leads 21 and 22 connected respectively to rails 19 and 18, with leads 21 and 22 being integrally electrically connected to a transformer 23, through which power is fed to the rails at the left-hand end of track section A, this system is physically applicable to a situation where power is fed from the opposite end of the track section under study.

There is provided in the lower end portion of the figure an inverter driver 29 supplied by power from terminals B10, N10 of a battery or other suitable source of direct current. This inverter driver takes its standby battery power from the direct current source located near the end of track section A and the inverter driver which can be of a solid state nature provides an alternating current output in a wholly conventional manner in that the operation of such inverter drivers is well known. Accordingly, no further discussion will be made with reference to the internal nature of the inverter driver 29, but only that this inverter driver will provide some preselected frequency output which will appear on electrical leads 31 and 32 which emanate from the inverter driver 29 and enter an inverter amplifier follower 28. The inverter amplifier follower may typically be a two-stage amplifier with a pair of outputs, which outputs are inductively coupled through transformer action in a wholly conventional manner. A typical two-stage amplifier with a pair of outputs, which outputs are transformer coupled as shown by the patent to W. J. Basharrah of Mar. 29, 1960, Patent No. 2,930,985 and is typical of the many available multioutput amplifiers that may be employed. The inverter amplifier follower 28 will have a separate direct current power source B10, N10, which power source will provide from the inverter follower the high energy alternating current necessary to operate the phase selective track circuit under study.

In this situation, while not depicted, it is readily apparent that the electrical leads 26 and 27, which establish one output from the inverter amplifier follower, as well as the output represented by the leads 33 and 34 of the inverter amplifier follower 28, may be derived through a conventional transformer couple.

As noted in the earlier portion of this application, there is provided a frequency synchronizing signal for each of the inverter amplifier followers present in the invention. Therefore, we will see that the leads 33 and 34, which contain this synchronizing frequency signal, are connected to a pair of line wires 37 and 38 which run parallel to the track circuit under study. In this instance there is provided in lead 34 a line circuit capacitor 36 selected of a value to provide tuning over the line circuit which includes the leads 37, 38, 39 and 41. The phase synchronizing signal which is on lines 33 and 34 enters the line wires 37 and 38 and is delivered to an inverter follower 46 via the leads 39 and 41, the lead 39 containing, for purposes of tuning and direct current blocking, a capacitor 44 and a line circuit phase correcting reactor 43. The values of these components 36, 43 and 44 are selected as the individual field situation requires. The inverter follower 46 has its separate source of power B10,N10, which provides the energy necessary to operate the following or succeeding phase selective track circuit, depicted to the right of track section A. The inverter follower 46 is of the same general type as that provided in the inverter amplifier follower 28, namely, a multistage push-pull amplifier utilizing solid state components which has at least three outputs, each of the outputs inductively coupled through transformer action to the output of the inverter amplifier follower 46. One of the energy outputs appears on leads 47 and 48 to supply to the phase selective unit 49 the necessary phase comparison signal, and another appears on the electrical leads 64 and 66. The latter is to provide the power necessary for the phase selective track circuit depicted to the right of track section A.

In a fashion similar to that discussed with reference to the inverter amplifier 28, there is a phase synchronizing signal delivered over the electrical leads 73 and 74 via a line capacitor 76 which appears in lead 74, which signal in turn is electrically connected to line wires 77 and 78, and hence through electrical leads 81 and 79, respectively, to the inverter follower 86, the lead 79 containing a tuning capacitor 84 as well as a line circuit phase correcting reactor 83 which operate in the same fashion as the line circuit tuning capacitor 44 and the correcting reactor 43 just previously described.

As was noted before, the inverter amplifier follower 46 has an output signal which is delivered over the leads 47 and 48 to a phase selective unit 49. This phase selective unit is of the same type set forth in the Staples Patent No. 3,046,454 noted earlier, and the operation of the phase selective unit is essentially the same as that set forth in the aforementioned Staples patent. While not shown herein there may be included in each of the inverter followers 28, 46 and 86 a coding means to deliver a coded signal to the rails of section A and section B. This coding feature is of course old and is described in detail within the Staples patent just noted. The coding means may, if desired, also be included in the associated inverter amplifier follower. Therefore, there is directly beneath the selective unit 49 a code following relay 51 electrically coupled to the phase selective unit 49 by leads 52, 53 and 54. The phase selective unit 49 is electrically coupled to the rails 18 and 19 via the pair of leads 56 and 57, and the transformer 61, as well as the electrical leads 62 and 63 connected respectively to rails 18 and 19. The lead 57, which emanates from the phase selective unit 49, has included in series a resistor 58 and a capacitor 59 both utilized for tuning purposes. It will be appreciated that, in order for the phase selective unit to operate, the phase relationship of the signal being delivered to the phase selective unit 49 over the leads 47 and 48 must be matched to the phase delivered through the rails 18 and 19 from the inverter amplifier follower 28 noted earlier, and the function of the tuning capacitor 59 and tuning resistor 58 is to provide the field location adjustments essential to provide the matching phase relationship essential for phase selective circuits of the type here involved.

Without going further it will be recognized, of course, that as soon as a vehicle, not shown in this figure, enters the track section A approaching from the left to the right in this figure, the rails 18 and 19 will be shunted and of course the phase relationship present will change in the track circuit which includes the rails 18 and 19, as well as the phase selective unit 49 depicted to the right and electrically coupled to the track circuit of track section A. This will produce the accompanying release of the code following relay 51, noted earlier, and in turn this will produce the appropriate change in signals for the track section involved.

The track section depicted to the right of track section A, namely, track section B, has as was noted a high energy signal delivered via the electrical leads 64 and 66 from the inverter follower 46, via the transformer 67, and leads 68 and 69, which are respectively connected to the rails 71 and 72. The power thus fed to the track section B is fed down the rails 71 and 72 to the electrical leads 102 and 103, which in turn are electrically coupled through a transformer 101 and leads 96 and 97 to a phase selective unit 89 of the same type discussed with reference to phase selective unit 49. The lead 97 has therein tuning capacitor 99 and resistor 98 which function in the same fashion as the capacitor 59 and resistor 58 discussed earlier with reference to phase selective unit 49. The phase selective unit 89 has in turn a code following relay 91 depicted immediately beneath it and electrically coupled via leads 92, 93 and 94. The code following relay 91 of track section B functions in the same manner as that just described with reference to track section A.

As has been noted, the inverter amplifier follower 86 is electrically coupled to inverter amplifier follower 46 via leads 79, 81, 77, 78, 73 and 74. There has been delivered to the inverter follower 86 a phase synchronizing signal which is amplified in the inverter amplifier follower 86, and because of the presence of the direct current power source B10,N10, which may be in the form of a battery, there is provided a fresh source of high energy power to be delivered to the track sections involved and to subsequent track sections not illustrated in full but positioned to the right of track section B. Accordingly, inverter amplifier follower 86 has at least three outputs, namely, the output which appears on leads 87 and 88, the output which appears on leads 85 and 90, and the synchronizing alternating current signal which appears on electrical leads 95 and 100 which emanate from the right of the inverter amplifier follower 86.

It should be noted that if the transmission line for the synchronizing signal is an existing battery fed line for relay control purposes, as will frequently be the case, blocking reactors such as the reactors 42 and 82 are necessary to prevent the battery or batteries, as the case may be, from short circuiting the synchronizing signal impressed on this line.

While the previous discussion points out that battery power may be provided at the wayside, it should be recognized that normally power to these types of circuits is provided from the transmission line along the railroad, or in the alternative from the catenary of the propulsion system. While not shown here, it will be appreciated that when batteries are used these batteries may be charged from rectifiers connected here to commercial alternating current power, or in the alternative to the catenary of the propulsion system. These are not shown as they do not relate specifically to the invention. In addition, the inverter driver 29 and the frequency of its operation will be selected to be compatible with the frequencies employed in the normal track circuits for any particular environment.

It will be seen that the invention disclosed herein provides the required standby operation essential without the cost of high energy transmission lines to provide the synchronous power, and this invention provides for the generation of large quantities of alternating current power from local power sources at each track feed point with high energy at each track feed point, for example, 250 volt amperes, with low energy pilot line synchronization, the pilot line energy in some instances being on the order of 1 volt ampere. Higher energies may at times be desirable to overcome interference caused, for example, by stray fields inducing currents in the transmission line. As has been noted, any batteries involved would normally be of the storage type and charged either from normal commercial power or from a step-down transformer and rectifier from the catenary if such catenary were involved. In this system it will be appreciated that only one inverter driver is used for any group of follower units and the inverter driver may either feed a pilot line to which each follower unit is connected, but not shown here, or the pilot line may be sectionalized as depicted in the single figure of this application and each follower unit then driven from the output of the previous follower unit except for the first follower unit which, of course, would be driven by the inverter drive unit.

In the situation here depicted, where the pilot line is sectionalized, the synchronizing power may be fed over either an unused pair of wires along the wayside, or to greater advantage may be superimposed on a signaling circuit such as a direct current line relay circuit conventionally employed adjacent the wayside.

In concluding, it will be appreciated that by the employment of this invention there is provided standby power for the track circuit operation without the need for employing costly high energy transmission lines along the wayside to provide the required synchronous power to the phase selective track circuit. This invention also copes uniquely with the problems that arise when there is a power outage, and this is accomplished by the utilization of the generation of a large quantity of alternating current power from standby power which may preferably comprise standby batteries at each track feed point with very low pilot line synchronizing energy. As a further concluding advantage this invention provides for the precise synchronization of power delivered to the track sections of phase selective track circuits by the utilization of preexisting unused line wires along the wayside to carry the low energy synchronizing power, or in the alternative by superimposing the low energy synchronizing power on a signaling circuit such as a direct current line relay circuit. This will therefore obviate the expense of added line wires in accomplishing the essential track detection function of the system.

It will be appreciated that our invention is not limited to use with a standby source of power, but provides advantages in connection with systems which are normally energized from filtered rectified alternating current in that it permits sequential changeover of the track circuits from previous circuit arrangements with minimum interference to the normal operation of an existing signaling system.

Obviously, certain modifications and variations of the invention as hereinbefore set forth may be made without departing from the spirit and scope thereof.

Having thus described our invention, what we claim is:

1. In a phase sensitive train detection system having a plurality of track sections insulated one from another wherein each of said track sections has an alternating current energy signal fed to the rails of said track sections at one end of said track sections, and where the polarity of said alternating current energy signal fed any one of said track sections is of opposite polarity to the adjacent track section and each of said track sections has electrically coupled at its other end a phase selective unit to compare said alternating current energy signal fed to the track with a matching polarity alternating current signal fed to said phase selective unit, the improvement to said phase sensitive train detection system comprising, (a) at least one means to convert direct current energy to said relatively high power level alternating current energy signal to provide said alternating current energy signal to said rails of at leaast one of said track sections at said one end of said track section as well as to provide a synchronizing alternating current energy signal, and (b) follower means responsive to said alternating current synchronizing signal to provide alternating current signals to said phase selective unit and to said adjacent track section at its said one end, said follower means also producing at least a third alternating current signal for use in adjacent track sections.

2. The phase sensitive train detection system of claim 1 wherein said converter means includes an inverter means supplied by direct current power from a storage battery and having an alternating current output.

3. The phase sensitive train detection system of claim 2 wherein the converter means of claim 2 includes an inverter follower amplifier means driven by said inverter means alternating current output to provide at least two alternating current signals, one of which is said relatively high power level signal to be fed to said one end of said track section and the other signal is a signal which will supply other follower means with a phase synchronizing signal.

4. The phase sensitive train detection system of claim 3 wherein said inverter follower amplifier means has a source of direct current energy supplied from a storage battery.

5. The phase sensitive train detection system of claim 3 wherein said inverter follower amplifier means supplies an alternating current phase synchronizing signal to said follower means via line wires adjacent the track sections to be controlled.

6. The phase sensitive train detection system of claim 5 wherein the follower means of claim 5 has a separate direct current power supply in the form of a storage battery.

7. In a phase sensitive train detection system having a plurality of track sections insulated one from another wherein each of said track sections has an alternating current energy signal of a relatively high power level fed to the rails of said track section at one end of said track sections, and wherein the polarity of said alternating current energy signal of a relatively high power level fed any one of said track sections is of opposite polarity to the adjacent track sections and each of said track sections has electrically coupled at its other end a phase selective unit to compare said alternating current energy signal received from the rails through said electrical couple with a matching polarity alternating current signal fed to said phase selective unit, the improvement to said phase sensitive train detection system providing continuous operation of said phase selective track circuits from battery power so that standby operation will be provided during power removal, by said system having (a) at least one converter means to convert direct current energy to said relatively high power level alternating current energy signal to provide said relatively high power level alternating current energy signal to said rails of at least one of said track sections at said one end of said track section as well as to provide said alternating current energy phase synchronizing signal, said converter including an inverter means supplied by standby direct current power, said inverter having an alternating current output delivered to an inverter follower amplifier means to provide at least two alternating current signals, one of which is said relatively high power level signal to be fed to said one end of said track section and the other signal is said phase synchronizing signal, (b) follower means responsive to said phase synchronizing signal to provide at least one alternating current signal to said phase selective unit and another to said adjacent track section at its said one end, said follower means also producing at least a third alternating current signal for phase synchronization on adjacent track sections, said follower means having a separate source of standby direct current power.

8. The phase sensitive train detection system of claim 7 wherein said inverter follower amplifier means supplies said alternating current phase synchronizing signal to said follower means via any available line wires adjacent the track sections to be controlled.

References Cited

UNITED STATES PATENTS

| | | | |
|---|---|---|---|
| 2,585,505 | 2/1952 | Shipp | 246—34 |
| 2,884,516 | 4/1959 | Staples | 246—34 |
| 3,046,454 | 7/1962 | Staples | 317—134 |

ARTHUR L. LA POINT, *Primary Examiner.*

RICHARD A. BERTSCH, *Assistant Examiner.*